Patented Nov. 6, 1923.

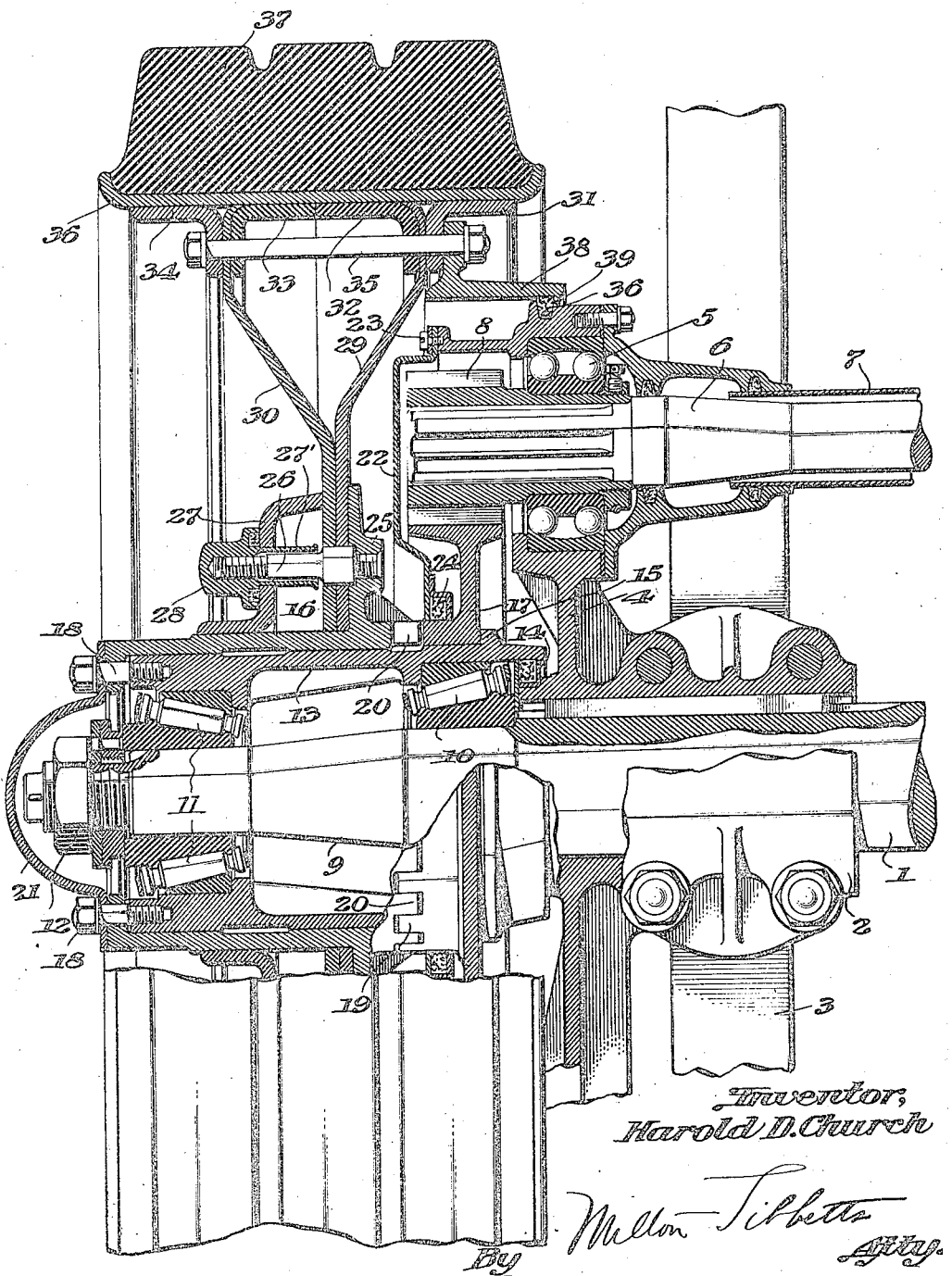

1,473,140

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed September 25, 1919. Serial No. 326,327.

*To all whom it may concern:*

Be it known that I, HAROLD D. CHURCH, a citizen of the United States, and resident of Detroit, Wayne County, State of Michigan, have invented certain new and useful Improvements in Motor Vehicles, of which the following is a specification.

This invention relates to motor vehicles and particularly to the axle and wheel parts thereof.

One of the objects of the invention is to provide an axle and wheel structure having simple demountable means for the wheel and a driving gear connection permitting easy removal of the wheel without disturbing the gear mounting.

Another object is to provide casing means for a reduction gear axle to retain oil around the gears and remain intact when the wheel is removed.

Another object is to provide a built-up wheel of novel and strong construction, such as may be used for instance on heavy commercial vehicles.

Another object is to combine a built-up wheel structure with a detachable wheel and axle of novel form, thus obtaining various advantages hereinafter pointed out.

Other objects of the invention will appear from the following description taken in connection with the drawings, which form a part of this specification and in which the figure represents a sectional view through a driving axle and wheel embodying the invention.

Referring to the drawing, 1 is a supporting axle shown as having a spring pad 2 keyed thereto and a spring 3 connected to the pad. The spring pad is extended in the form of a flange 4 which forms one of the walls of an enclosure or casing for the gearing hereinafter described. This flange also supports in bearings 5 the outer end of a driving axle shaft or section 6 enclosed by a tube 7 and preferably extending from a differential (not shown) at the middle of the axle. The shaft 6 extends outwardly beyond the flange 4 and has a pinion or gear 8 keyed or otherwise fastened to its end to turn with it.

The supporting axle 1 above referred to extends beyond the spring pad in the form of a spindle 9 upon which are separated bearings 10 and 11, adjusted axially by a nut 12 threaded on the end of the spindle. Upon these bearings the vehicle wheel is mounted, said wheel comprising inner and outer separable hubs, the inner of which is put on the spindle with the bearings and the outer of which is detachably secured to the inner hub so that it may be readily demounted therefrom without disturbing the bearings.

The inner hub is in the form of a sleeve 13 directly supported by the bearings 10 and 11. At its inner end a packing 14 is provided to retain the lubricant in the bearings and a flange 15 forms an abutment or stop for the outer hub 16 and its driving gear 17. This driving gear 17 meshes with and is driven by the pinion 8 and it may be, as shown, formed to slide on the sleeve 13 to its position against the abutment 15.

The outer hub 16 of the wheel also slides on the inner hub or sleeve 13 to which it is detachably secured, for holding purposes only and not for driving, as by the bolts 18. Instead of transmitting the drive from the gear 17 to the sleeve 13 and then to the outer hub 16, the gear 17 and hub 16 are formed with interengaging clutch teeth 19 and 20 respectively which permit sliding engagement as the hub 16 is pushed into place on the sleeve 13. A hub cap 21 may be bolted over the outer end of the hub 16 to protect the bearings.

To complete the enclosure or casing of the gears 8 and 17 so that they may run in an oil bath, a casing member 22 is provided, being detachably secured to the casing part or flange 4 as by a series of screws 23. This casing member extends on the outside of the gears 8 and 17 and makes a running joint with the hub of the gear 17 as by the packing 24. This is just inside of the clutch teeth 19 so that the hub 16 may be withdrawn or removed from the sleeve 13 without disturbing the packing. This arrangement also brings the joint rather close to the axis of the rotating parts so that considerable oil may be carried in the casing without leaking out.

The wheel hub 16 above referred to is formed with a flange 25 to which the other parts of the built-up wheel are secured. The flange has a series of studs 26 riveted in place as shown and a clamping plate 27 and series of nuts 28 complete the fastening means. By forming the clamping plate 27 of dished shape as shown the nuts are brought out nearer the outer end of the hub where they are more accessible and the side strains on the wheel are transmitted to separated parts of the hub 16 instead of having them all taken by the flange 25. Sleeves 27 are secured in place in the plates 27 to guide the studs 26 as the wheel parts are put together.

Two plates or disks 29 and 30 having their middle parts arranged face to face and their outer parts separated in somewhat conical form, have suitable openings for the studs 26 and may be placed on over the hub 16 against the outer face of the flange 25 and clamped between the latter and the plate 27 by the nuts 28. The disks 29 and 30 are each tapered in cross section towards the circumference and a rim, shown as formed of four parts 31, 32, 33 and 34, is secured to them as by the bolts 35. A tire rim 36 and tire 37 are suitably secured to the other rim. There is also a brake flange 38 secured to the wheel rim and its inner surface makes a running packed joint with the circumference of the flange 4 as at 39.

Other forms of the invention than the particular one shown herein may be used without departing from the spirit or scope thereof.

I claim:

1. In a motor vehicle, in combination, a supporting axle, bearings thereon, inner and outer detachably connected hubs supported by the bearings, a wheel on one of said hubs, a driving gear directly but detachably connected to the wheel hub, and means for driving said gear.

2. In a motor vehicle driving axle, in combination, a supporting axle, a hub mounted on bearings thereon, a driving gear mounted on said hub and having clutch teeth, means for driving said gear, and a wheel having a hub detachably connected to the first said hub and having clutch teeth engaging the clutch teeth of said gear.

3. In a motor vehicle driving axle, in combination, a supporting axle, a hub mounted on bearings thereon, a driving gear having clutch teeth, means for driving said gear, and a wheel having a hub detachably mounted on the first said hub and having teeth engaging the clutch teeth of said gear.

4. In a motor vehicle driving axle, in combination, a supporting axle, a sleeve forming an inner hub mounted on bearings on said supporting axle, a wheel having a hub detachably mounted on said inner hub, and having driving clutch teeth, a driving gear clutched to said wheel hub, and means for driving said gear.

5. In a motor vehicle driving axle, in combination, a supporting axle, a sleeve forming an inner hub mounted on bearings on said supporting axle, a wheel having a hub detachably mounted on said inner hub, a gear directly but detachably connected to said wheel hub, and means for driving said gear.

6. In a motor vehicle, in combination, inner and outer wheel hubs detachably connected together, a gear directly connected, and a wheel detachably connected, to the outer of said hubs, independently of each other.

7. In a motor vehicle, in combination, inner and outer wheel hubs detachably connected together, a driving gear, clutch means between the outer hub and the driving gear, and means for securing the hubs together and the outer hub to the driving gear.

8. In a motor vehicle, in combination, inner and outer wheel hubs detachably connected together, a driving gear detachably clutched directly to the outer hub, and a wheel detachably connected to the outer hub.

9. In a motor vehicle, in combination, inner and outer wheel hubs detachably connected together, the outer hub having a radial flange, and a wheel having a disk part detachably connected to said flange, and a driving gear detachably clutched directly to said outer hub.

10. In a motor vehicle, in combination, inner and outer wheel hubs detachably connected together, a driving gear, clutch means between the outer hub and the driving gear, and means for securing the hubs together, said latter means also retaining the clutch means in place.

11. In a motor vehicle, in combination, inner and outer wheel hubs detachably connected together, a gear, and separate means directly connecting said gear to the outer hub.

12. In a motor vehicle, in combination, inner and outer wheel hubs detachably connected together, and a gear detachably connected directly to the outer hub, independently of said inner hub.

13. In a motor vehicle, in combination, a supporting axle, a flange thereon, a driving shaft and pinion mounted in said flange, a sleeve mounted on bearings on said supporting axle outwardly of said flange, a gear on said sleeve driven by said pinion, and a wheel detachably mounted on said sleeve and having sliding clutching relation with said gear.

14. In a motor vehicle, in combination, a supporting axle, a flange thereon, a driving shaft and pinion mounted in said flange, a sleeve mounted on bearings on said supporting axle outwardly of said flange, a gear on said sleeve driven by said pinion, and a wheel detachably mounted on said sleeve and having sliding clutching relation with said gear, and a casing secured to said flange and extending outside of said gear and pinion and making a running joint with the hub of said gear.

15. In a motor vehicle, in combination, a supporting axle, a sleeve mounted on bearings thereon, a gear on said sleeve, a casing over said gear making a running joint with the hub of said gear, and a wheel detachably mounted on said sleeve and having sliding clutching relation with the hub of said gear outside of said casing whereby the wheel may be removed from the sleeve without disturbing said gear or casing.

16. In a motor vehicle, in combination, a supporting axle, a flange thereon, a driving shaft and pinion mounted on said flange, a sleeve mounted in bearings on said axle, a gear on said sleeve driven by said pinion, said gear having a hub provided with clutch teeth, a wheel hub on said sleeve and having clutch teeth meshing with the teeth on the gear hub, said wheel hub having a radial flange, disks secured to said flange and a rim carried by said disks.

17. In a motor vehicle, in combination, inner and outer wheel hubs detachably connected together, and a gear mounted and centered upon the inner hub and directly connected to the outer hub, independently of said inner hub.

In testimony wherof I affix my signature.

HAROLD D. CHURCH.